(12) United States Patent
Akisada et al.

(10) Patent No.: US 11,993,057 B2
(45) Date of Patent: May 28, 2024

(54) FILM TO HOLD A METAL LAYER, METALLIC DECORATIVE SHEET INTERMEDIATE PRODUCT, METALLIC DECORATIVE SHEET, EXTRUDED LAMINATE PRODUCT, METALLIC MOLDED PRODUCT, INJECTION MOLDED PRODUCT, METHOD FOR PRODUCING A METALLIC MOLDED PRODUCT, METHOD FOR PRODUCING INJECTION MOLDED PRODUCT, AND METHOD FOR PRODUCING AN EXTRUDED LAMINATE PRODUCT

(71) Applicant: Wavelock Advanced Technology Co., Ltd., Tokyo (JP)

(72) Inventors: Chikatsu Akisada, Ibaraki (JP); Tetsuya Kurosawa, Ibaraki (JP); Ryuta Takeuchi, Ibaraki (JP)

(73) Assignee: Wavelock Advanced Technology Co., Ltd., Tokyo (JP)

( * ) Notice: Subject to any disclaimer, the term of this patent is extended or adjusted under 35 U.S.C. 154(b) by 760 days.

(21) Appl. No.: 16/959,579

(22) PCT Filed: Jan. 9, 2019

(86) PCT No.: PCT/JP2019/000324
§ 371 (c)(1),
(2) Date: Jul. 1, 2020

(87) PCT Pub. No.: WO2019/139030
PCT Pub. Date: Jul. 18, 2019

(65) Prior Publication Data
US 2020/0384734 A1    Dec. 10, 2020

(30) Foreign Application Priority Data
Jan. 12, 2018    (JP) ................................ 2018-003304

(51) Int. Cl.
*B32B 15/09* (2006.01)
*B29C 45/14* (2006.01)
(Continued)

(52) U.S. Cl.
CPC ........ *B32B 15/09* (2013.01); *B29C 45/14262* (2013.01); *B29C 45/14688* (2013.01);
(Continued)

(58) Field of Classification Search
None
See application file for complete search history.

(56) References Cited

U.S. PATENT DOCUMENTS 4,407,871 A * 10/1983 Eisfeller ............. C23C 14/5806
427/296
4,431,711 A * 2/1984 Eisfeller ................ B05D 5/068
427/296

(Continued)

FOREIGN PATENT DOCUMENTS

| CA | 2 602 565 A1 | 10/2006 |
| EP | 0685509 A1 | 12/1995 |

(Continued)

OTHER PUBLICATIONS

Takahashi—JP 2000-063539 A—Jap.Off.Ref. D8—MT—polyester film Tm 150-265 for metal plate—2000 (Year: 2000).*

(Continued)

*Primary Examiner* — John Vincent Lawler
(74) *Attorney, Agent, or Firm* — Fitch, Even, Tabin & Flannery, LLP

(57) ABSTRACT

An objective of the present invention is to provide a film to hold a metal layer, a metallic decorative sheet intermediate product, a metallic decorative sheet, a metallic molded product, and a method for producing a metallic molded product which prevent the occurrence of the whitening (Continued)

phenomena or the like of the metallic molded product which occur during production of the metallic molded products by using a metallic decorative sheet, as well as enables molding in a wider temperature range. A film to hold a metal layer comprises a thermoplastic resin having a melting point of 230° C. to 250° C. is provided, wherein the film to hold a metal layer has transparency.

18 Claims, 4 Drawing Sheets

(51) Int. Cl.
  *B29K 667/00* (2006.01)
  *B29K 705/00* (2006.01)
  *B29L 9/00* (2006.01)
  *B32B 7/12* (2006.01)
  *B32B 37/12* (2006.01)

(52) U.S. Cl.
  CPC ............... *B32B 7/12* (2013.01); *B32B 37/12* (2013.01); *B29K 2667/00* (2013.01); *B29K 2667/003* (2013.01); *B29K 2705/00* (2013.01); *B29L 2009/003* (2013.01); *B32B 2451/00* (2013.01)

(56) References Cited

U.S. PATENT DOCUMENTS

| | | | | |
|---|---|---|---|---|
| 6,103,390 | A * | 8/2000 | Kamiya | G09F 7/16 428/458 |
| 6,287,672 | B1 * | 9/2001 | Fields | B32B 15/08 428/209 |
| 6,565,955 | B2 * | 5/2003 | Fields | B32B 7/12 428/209 |
| 7,666,497 | B2 | 2/2010 | Takatsuki et al. | |
| 7,964,265 | B2 | 6/2011 | Matsui et al. | |
| 2003/0190485 | A1 * | 10/2003 | Takatsuki | B32B 27/00 428/458 |
| 2005/0175843 | A1 * | 8/2005 | Johnson | B44C 3/025 428/423.1 |
| 2007/0098967 | A1 * | 5/2007 | Ido | C23C 14/024 428/209 |
| 2009/0123697 | A1 * | 5/2009 | Matsui | B32B 27/36 428/458 |
| 2017/0137928 | A1 * | 5/2017 | Hara | H01Q 1/3283 |
| 2019/0275759 | A1 * | 9/2019 | Nishio | B32B 9/041 |

FOREIGN PATENT DOCUMENTS

| | | | | |
|---|---|---|---|---|
| EP | 1 872 935 A1 | | 1/2008 | |
| JP | H11-49873 A | | 2/1999 | |
| JP | 2000/063539 | * | 2/2000 | ............ B29C 55/12 |
| JP | 2000-063539 A | | 2/2000 | |
| JP | 2004-001243 A | | 1/2004 | |
| JP | 2005/335309 | * | 12/2005 | ............ B29C 55/02 |
| JP | 2005-335309 A | | 12/2005 | |
| JP | 2006-289818 A | | 10/2006 | |
| JP | 2007/168148 | * | 7/2007 | ............ B32B 27/36 |
| JP | 2007-168148 A | | 7/2007 | |
| JP | 2007-168377 A | | 7/2007 | |
| JP | 2007-203569 A | | 8/2007 | |
| JP | 2008-055688 A | | 3/2008 | |
| JP | 2008/279777 | * | 11/2008 | ............ B32B 15/08 |
| JP | 2010082963 A | * | 4/2010 | ............ B32B 15/08 |
| JP | 2013-230642 A | | 11/2013 | |
| WO | 2006/104116 A1 | | 10/2006 | |

OTHER PUBLICATIONS

Yamamoto—JP 2005-335309 A—ISR D2 —MT—metal deposited on oriented polyester film—2005 (Year: 2005).*
Matsui—JP 2007-168148 A—Euro D3—MT—oriented polyester for molded member—melting pt+haze value—2007 (Year: 2007).*
Ebiya—JP 2008-279777 A—MT—polyester coated metal sheet—Tm 180-240—2008 (Year: 2008).*
Maeda—JP 2010-082963 A—MT—polyester film w-metal layer & other layers—2010 (Year: 2010).*
Japan Patent Office, International Search Report for International Application No. PCT/JP2019/000324 dated Mar. 12, 2019, and English translation, 4 pages.
Japan Patent Office, Written Opinion of the International Searching Authority for International Application No. PCT/JP2019/000324 dated Mar. 12, 2019, 6 pages.
Japanese Patent Office, Notice of Reasons for Refusal for corresponding Japanese Patent Application No. 2018-003304 dated Sep. 14, 2021 and machine English translation, 8 pages.
European Patent Office, Extended European Search Report for European Patent Application 19738578.4 dated Aug. 16, 2021, 9 pages.

* cited by examiner

FILM TO HOLD A METAL LAYER, METALLIC DECORATIVE SHEET INTERMEDIATE PRODUCT, METALLIC DECORATIVE SHEET, EXTRUDED LAMINATE PRODUCT, METALLIC MOLDED PRODUCT, INJECTION MOLDED PRODUCT, METHOD FOR PRODUCING A METALLIC MOLDED PRODUCT, METHOD FOR PRODUCING INJECTION MOLDED PRODUCT, AND METHOD FOR PRODUCING AN EXTRUDED LAMINATE PRODUCT

CROSS-REFERENCE TO RELATED APPLICATIONS

This application is a U.S. national phase application filed under 35 U.S.C. § 371 of International Application Number PCT/JP2019/000324, filed Jan. 9, 2019, designating the United States, which claims priority from Japanese Patent Application Number JP 2018-003304, filed Jan. 12, 2018.

BACKGROUND OF THE INVENTION

Technical Field

The present invention relates to a film to hold a metal layer, a metallic decorative sheet intermediate product, a metallic decorative sheet, an extruded laminate product, a metallic molded product, an injection molded product, a method for producing a metallic molded product, a method for producing injection molded product, and a method for producing an extruded laminate product.

Background Art

A metallic decorative sheet can be reduced in cost and weight without spoiling the sense of high quality. Therefore, it has been used as a substitute of a metal material conventionally used. Furthermore, the demand for metallic decorative sheets is growing because they can provide a metallic appearance to a surface of a resin portion of the interior or exterior of automobiles, home appliances, smartphones, amusement products and the like.

As such a metal decorative sheet, e.g. Patent Document 1 discloses a metallic decorative sheet with a structure which includes a metal deposited layer, a transparent film and a thermoplastic resin sheet laminated in this sequence.

CITATION LIST

Patent Literature

Patent Document 1: JP 2008-055688 A

SUMMARY OF THE INVENTION

As a method for producing a metallic molded product using a metallic decorative sheet, e.g. a method may be conceivable in which a metallic decorative sheet is heated to a predetermined temperature to exhibit plasticity so that it can be easily processed, wherein it is thereafter fitted to a predetermined mold. With this method, a metallic molded product with any shape can be produced upon a shape of the mold.

However, depending on combination of materials of layers constituting the metallic decorative sheet, finishing property of the metallic molded product may be reduced due to a phenomenon in which the metallic decorative sheet is whitened in a temperature range exhibiting the plasticity, a rainbow like an interference pattern occurs, or the metal layer is deformed (hereinafter, these three phenomena may be referred to as a "whitening phenomenon or the like" collectively). Unless the metallic decorative sheet is heated to a temperature at which whitening or the like occurs, the whitening phenomena or the like can be prevented. However, a temperature range from a temperature at which the metallic decorative sheet exhibits plasticity allowing molding the metallic decorative sheet to a temperature the whitening phenomenon or the like occurs is very narrow. As a result, the temperature range allowing molding is very narrow. For this reason, the temperature control of the metallic decorative sheet may be difficult, and the molding may be difficult. Further, since the temperature range allowing molding is narrow, even when metallic molded products are manufactured based on the same condition, normal molded products and molded products in which a whitening phenomenon or the like has occurred may be produced due to slight difference in temperature during molding and/or required time for molding etc., not only between different lots but also within the same lot, which may reduce a yield of products.

In view of the above problems, an objective of the present invention is to provide a film to hold a metal layer, a metallic decorative sheet intermediate product, a metallic decorative sheet, an extruded laminate product, a metallic molded product, an injection molded product, a method for producing a metallic molded product, a method for producing injection molded product, and a method for producing an extruded laminate product which prevent the occurrence of the whitening phenomena or the like of the metallic molded product which occur during production of the metallic molded products by using a metallic decorative sheet, as well as enables molding in a wider temperature range.

In order to achieve the above-mentioned objective, a film to hold a metal layer of the present invention includes a thermoplastic resin having a melting point of 230° C. to 250° C., wherein the film to hold a metal layer has transparency.

The film may be a film that is softened and drawn down by heating, and a temperature difference between a temperature at which the film recovers from the drawdown and a temperature at which the film starts to hang down due to melting may be from 95° C. to 120° C.

The thermoplastic resin may be a polyester-based resin.

The thermoplastic resin may be a modified polyethylene terephthalate resin.

The film to hold a metal layer may have a total luminous transmittance of 85% Or more.

The film to hold a metal layer may have a haze of 2.0% or less.

Further, in order to achieve the above-mentioned objective, a metallic decorative sheet intermediate product of the present invention includes a metal layer and a film layer to hold a metal including the film to hold the metal, wherein the film holds the metal layer.

The metallic decorative sheet intermediate product may include a first laminate with the film layer to hold the metal, the metal layer and a first adhesive layer laminated in this sequence.

The metallic decorative sheet intermediate product may include a second laminate with the film layer to hold the metal, the metal layer, the first adhesive layer and a base film layer laminated in this sequence.

The metallic decorative sheet intermediate product may include a third laminate with a protection film layer having transparency, a second adhesive layer, the film layer to hold the metal, the metal layer, and the first adhesive layer laminated in this sequence.

Further, in order to achieve the above-mentioned objective, a metallic decorative sheet of the present invention includes a fourth laminate with a protection film layer having transparency, a second adhesive layer, a film layer to hold a metal including the film to hold the metal, wherein the film holds a metal layer, the metal layer, a first adhesive layer and a base film layer laminated in this sequence.

Further, in order to achieve the above-mentioned objective, an extruded laminate product of the present invention is an extruded laminate product with the protection film layer and/or the base film layer of the metallic decorative sheet on which a resin sheet is laminated.

Further, in order to achieve the above-mentioned objective, a metallic molded product of the present invention includes a molded product of the metallic decorative sheet.

Further, in order to achieve the above-mentioned objective, an injection molded product of the present invention includes a resin layer injection-molded on a surface of a base film layer of a metallic molded product.

Further, in order to achieve the above-mentioned objective, the method for producing a metallic molded product of the present invention includes a molding step of fitting the metallic decorative sheet having a surface temperature of 160° C. to 215° C. to a mold to obtain a molded product.

According to the method for producing a metallic molded product, the metallic decorative sheet may be fitted to the mold by vacuum and/or compressed air.

The method for producing a metallic molded product may include, before the molding step, a clamping step of clamping the metallic decorative sheet, and a heating step of heating the metallic decorative sheet after the clamping step.

Further, in order to achieve the above-mentioned objective, a method for producing an injection-molded product of the present invention includes an injection molding step of injecting a resin by using an injection molding die, between a surface of a base film layer of a metallic molded product obtained by the method for producing metallic molded product and the injection molding die to form a resin layer and thereby obtaining a molded product with the metallic molded product being integrated with the resin layer.

Further, in order to achieve the above-mentioned objective, a method for producing an extruded laminate product of the present invention includes a laminating step of laminating a molten resin sheet on the protection film layer and/or the base film layer of the metallic decorative sheet.

According to the present invention, a film to hold a metal layer, a metallic decorative sheet intermediate product, a metallic decorative sheet, an extruded laminate product, a metallic molded product, an injection molded product, a method for producing a metallic molded product, a method for producing injection molded product, and a method for producing an extruded laminate product can be provided which prevent the occurrence of the whitening phenomena or the like of the metallic molded product which occur during production of the metallic molded products by using a metallic decorative sheet, as well as enables molding in a wider temperature range.

DESCRIPTION OF EMBODIMENTS

Figure 1:
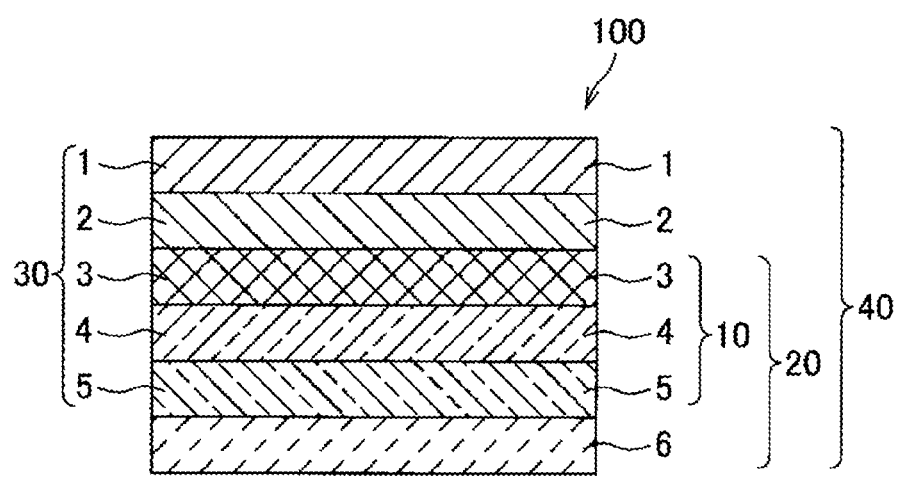
FIG. 1 is a schematic diagram illustrating a cross section of a metallic decorative sheet according to an embodiment of the present invention.

Hereinafter, a film to hold a metal layer, a metallic decorative sheet intermediate product, a metallic decorative sheet, an extruded laminate product, a metallic molded product, an injection molded product, a method for producing a metallic molded product, a method for producing injection molded product, and a method for producing an extruded laminate product according to the present invention will be described. The present invention is not limited to the examples described below, but can be subject to any modification which does not depart from the gist of the present invention.

[Film to Hold a Metal Layer]

A film to hold a metal layer according to an embodiment of the present invention is a film which holds a metal layer on one or both sides, which includes a thermoplastic resin having a melting point 230° C. to 250° C., wherein the film to hold a metal layer has transparency. For example, in case of the film holding a metal layer on one side, it is possible to form a metallic decorative sheet via a metallic decorative sheet intermediate product, which is preferable e.g. for a small amount lot and/or inventory management.

A melting point of the film to hold the metal layer may be, for example, a melting temperature determined by using a differential scanning calorimeter (DSC) according to JIS (Japanese Industrial Standard) K 7121.

When the film to hold a metal layer has such a total luminous transmittance that the metal layer is visible, it is not problematic, but the total luminous transmittance can be selected as appropriate depending on a type of design to be represented, such as plating tone, satin plating tone, stainless steel tone, aluminum tone, satin tone and matte tone. For example, in the case of a chromium plating tone, the total luminous transmittance of 85% or more can satisfy the decorativeness and design provided by the metal layer. More preferably, when the total luminous transmittance is 88% or more, the same decorativeness and design as the metal material can be satisfied. The total luminous transmittance less than 85% may reduce the visibility of the metal layer and may not satisfy the decorativeness and design. Even if the total luminous transmittance is 100%, there is no problem in transparency. An upper limit of the total luminous transmittance of the film to hold a metal layer is generally about 99%.

Furthermore, when the film to hold a metal layer has such a haze that the metal layer is visible, it is not problematic, but the haze can be selected as appropriate depending on a type of design to be represented, such as plating tone, satin plating tone, stainless steel tone, aluminum tone, satin tone and matte tone. A lower limit of the haze of the film is generally 0.1%. Further, the haze larger than 50% may not satisfy the decorativeness and the design since the visibility of the metal layer may be reduced due to diffusion of light.

For example, the haze for plating tone, stainless steel tone, aluminum tone and satin tone is preferably 0.3% to 2%, 2% to 10%, 10% to 20% and 20% to 40%, respectively.

By controlling the above-mentioned total luminous transmittance and/or haze and adjusting the transparency of the film to hold a metal layer as appropriate, it is possible to provide desired decorativeness and design to the metallic decorative sheet.

When molding the metallic decorative sheet by heating which was obtained using the film to hold a metal layer, the melting point of the film to hold a metal layer of 230° C. to 250° C. can improve the heat resistance of the metallic decorative sheet and widen the range of temperature which exhibits the plasticity enabling molding the metallic decorative sheet. As a result, the temperature control of the metallic decorative sheet is easier and the moldability is improved which can maintain a good yield. When the melting point is less than 230° C., the range from the temperature which exhibits plasticity enabling molding the metallic decorative sheet to the temperature at which the whitening phenomenon or the like occurs may be very narrow, i.e., the temperature range with moldability may be very narrow. On the other hand, when the melting point is higher than 250° C., there is no problem with moldability. An upper limit of the melting point of the film to hold a metal layer is generally 250° C.

The thermoplastic resin may have crystallinity. A thermoplastic resin having crystallinity is suitable for a film to hold a metal layer for metal vapor deposition because it is a thin film, has high thickness precision, rigidity and slipperiness. A thermoplastic resin having no crystallinity is softened or hardened depending to a temperature change. Therefore, when using the film to hold a metal layer, metal of the metal layer may be migrated by heating to cause the whitening phenomenon or the like.

The film to hold a metal layer is a film which is softened and drawn down by heating, wherein a temperature difference between a temperature at which the film recovers from the drawdown and a temperature at which the film starts to hang down by melting may be 95° C. to 120° C.

Drawdown is a phenomenon where a film or sheet is softened and hangs down during thermoforming. In a state where the drawdown has occurred, it is very difficult to mold the metallic decorative sheet. Further, when molding is performed in this state, the sheet may be torn or wrinkled.

When the film to hold a metal layer is heated e.g. to a temperature equal to or larger than a softening point after drawdown, the thermal motion of the resin molecules occurs intensively which causes thermal shrinkage to tense the film. The temperature of the film which causes this state shall be a temperature at which the film recovers from the drawdown. Then, by further increasing the temperature of the film which has recovered from the drawdown, the film starts to hang down due to melting the film. The temperature at which the hanging down is started is slightly lower than the melting point of the film. If the film reaches the melting point, holes may be formed in the film to make it difficult to maintain the film shape.

With the temperature difference of 95° C. to 120° C. between the temperature at which the film to hold a metal layer recovers from the drawdown and the temperature at which it starts to hang down due to melting, the range of temperature is wider which exhibits plasticity allowing molding the metallic decorative sheet in case of combination with a protection film and/or a metal layer and base film layer etc. to form the metallic decorative sheet. As a result, the temperature control of the metallic decorative sheet is easier and the moldability is improved which can maintain a good yield. This means, if the temperature difference is increased, the range of temperatures which facilitates molding the metallic decorative sheet is wider, so that the processing into the metallic molded product is facilitated.

When the temperature difference is less than 95° C., the temperature range from the temperature which exhibits plasticity allowing molding the metallic decorative sheet to the temperature at which the whitening phenomenon or the like occurs becomes narrow. Therefore, the temperature range allowing molding may be narrower, so that temperature control and/or deformation processing may be more difficult and thereby molding may be more difficult and/or whitening phenomena or the like may occur. Furthermore, the temperature difference more than 120° C. is not problematic, however, an upper limit of the temperature difference is 120° C. for a film to hold a metal layer which may be included in the film to hold the metal layer.

As the thermoplastic resin, a polyester-based resin and/or a polyolefin-based resin can be used. As the polyolefin-based resin, a low-density polyethylene resin, a polypropylene resin, or the like can be used. As the polypropylene resin, a homopolymer, a block copolymer, and a random copolymer etc. may be conceivable, but it is not particularly limited thereto.

In particular, a polyester-based resin having excellent adhesion to the metal layer can be used. Further, the polyester-based resin can sufficiently provide metallic luster of the metal layer, so that it can satisfy the same decorativeness and/or design as the metal material. Further, since polyester-based resin is excellent in handleability, for example, when laminating the film to hold a metal layer with another layer in case of manufacturing the metallic decorative sheet using the film to hold a metal layer, occurrence of wrinkles can be prevented. Furthermore, a polyester-based resin can prevent unevenness of the metal layer due to excessively stretching the film to hold a metal layer. As the polyester-based resin, a usual polyethylene terephthalate resin or the like, such as an amorphous polyethylene terephthalate ("APET") resin or a modified polyethylene terephthalate (MPET) resin can be used. Focusing on moldability, modified polyethylene terephthalate (MPET) resin can be used, in particular because of its suitability for deep drawn molded products.

Further, by using an MPET resin as the thermoplastic resin, the metallic luster is particularly vivid in case that such a resin is used to produce the metallic decorative sheet, wherein the decorativeness and/or the design can be thereby satisfied sufficiently. Further, in the case of producing a metallic molded product by using the metallic decorative sheet, MPET resin can prevent the whitening phenomena or the like even at a corner of the molded product with an extremely small radius of curvature.

The MPET resin may be obtained by polymerization using ethylene glycol and terephthalic acid as basic monomers and further using a monomer for modification which is condensed by dehydration to form an ester bond. As the monomer for modification, 1,3-propanediol, 1,4-butanediol, 1,4-cyclohexanedimethanol, neopentyl glycol, isophthalic acid, and 2,6-naphthalenedicarboxylic acid and the like may be conceivable. In particular, by using neopentyl glycol as the monomer for modification, a high melting point can be achieved, and the temperature difference between the temperature of recovery from the drawdown and the temperature at which hanging down starts due to melting can be increased, and simultaneously crystallization of the film can be suppressed even when performing a biaxial stretching process, which can achieve an excellent moldability. Therefore, when the film to hold a metal layer is applied to the metallic decorative sheet, the temperature control of the metallic decorative sheet can be more easily performed, the moldability is improved, which can maintain a good yield. Furthermore, it can have both excellent metal vapor deposition property, light resistance and chemical resistance, and in particular, has a vivid metallic luster as the metallic decorative sheet. Further, in the case of producing a metallic molded product using the metallic decorative sheet, the occurrence of the whitening phenomena or the like can be prevented even at a corner of the molded product having a extremely small radius of curvature, while the thickness of the film can be made thinner more easily than conventional ones. Accordingly, both the effects of improved productivity and cost reduction can be further achieved. Additionally, metallic luster can be provided to a surface with a complicated shape more easily to realize improved decorativeness and design.

The ratio of the monomer for modification may be any ratio which can provide the effect of the modification without impairing the properties of the polyethylene terephthalate. For example, with the ratio of the monomer for modification in the MPET being 5 mol % to 50 mol %, the temperature control of the metallic decorative sheet can be further facilitated which can achieve an improved moldability to maintain a good yield. Further, the mixing ratio of various types of modified monomers can be any ratio which can provide the effect of modification without impairing the properties of polyethylene terephthalate. For example, as a diol component, ethylene glycol and neopentyl glycol may be modified at a mass ratio of 95:5 to 50:50 as a mixing ratio, and as a carboxylic acid component, terephthalic acid and isophthalic acid may be modified at a mass ratio of 95:5 to 50:50 as a mixing ratio. Further, only neopentyl glycol may be modified. With regard to a mixing ratio of the diol component and the carboxylic acid component, it can be determined e.g. in any manner where the number of hydroxyl groups is equal to the number of carboxyl groups.

The thermoplastic resin used for the film to hold a metal layer may be available e.g. in pellet or flaky form. Then, the thermoplastic resin may be made into a film e g by biaxial stretching process with a calendering method, extrusion method or another known method to obtain the film to hold a metal layer.

The film to hold a metal layer may contain additives such as a stabilizer, an ultraviolet absorber, a lubricant, a flame retardant, a pigment and a dye, in addition to the thermoplastic resin.

The thickness of the film to hold a metal layer may be reduced to enable a roll length per a roll to be increased, which can achieve a high productivity and a sufficient low cost effect. For example, the thickness of the film to hold a metal layer may be 100 μm or less, and in consideration of higher productivity and low cost effect, the thickness is more preferably 40 μm or less, and still more preferably 25 μm or less. A lower limit of the thickness of the film to hold a metal layer is not particularly limited as long as it is sufficient for holding the metal layer and/or handling for forming the metallic decorative sheet. For example, the thickness of the film to hold a metal layer may be 3 μm or more, more preferably 5 μm or more.

The film to hold a metal layer may be subjected to sand matting, etching and/or hairline process on its surface. Such a process may improve a holding effect of the metal layer, and can express a desired design such as matte tone and/or aluminum tone. For example, the processes mentioned above may be performed on a surface of the film to hold a metal layer that holds the metal layer to obtain a desired design.

[Metallic Decorative Sheet Intermediate Product]

A metallic decorative sheet intermediate product according to an embodiment of the present invention includes a metal layer and a film layer to hold a metal including the film to hold the metal layer, wherein the film holds the metal layer.

(Metal Layer)

The metal layer included in the metallic decorative sheet intermediate product is not particularly limited as long as it is a layer formed from metal which can provide decorativeness and design comparable to a plating part used for a decorated part and/or to a component made of metal material. The metal that can be used is one metal or alloy or a combination of metals or alloys that can provide a sufficient metallic luster to the metallic decorative sheet and have excellent malleability. Specifically, it is possible to use one or more selected from a group consisting of aluminum, indium, chromium, zinc, gallium, nickel, tin, silver, gold, silicon, chromium, titanium, platinum, palladium, nickel, stainless steel, hastelloy, and the like, and alloys thereof.

Among the above-mentioned metals, particularly indium, tin or an alloy thereof is advantageous when performing three-dimensional molding by deep drawing. In particular, by using indium or an indium alloy, decorativeness and design can be satisfied while following various shapes of the molded product in the case of a metallic molded product.

Further, it is more preferable that the metal layer is made of indium having a high purity of 99.9% or more, since it can be applied to the molding of a molded product having a deep drawing and an extremely small radius of curvature. It is to be noted that when molding a usual deep drawing molded product, aluminum, zinc, gallium, nickel, tin, silver, gold, silicon, chromium, titanium, platinum, palladium, nickel, stainless steel and/or hastelloy, etc. may be mixed with indium as appropriate to be used as a mixture. Further, these metals may be alloyed with indium for use. In particular, by using indium or tin in combination with these metals, or an indium tin alloy, excellent decorativeness and design can be satisfied.

The thickness of the metal layer is not particularly limited, but is preferably from 10 nm to 100 nm in view of decorativeness and design. When the thickness of the metal layer is less than 10 nm, sufficient metallic luster may not be provided when forming a metallic decorative sheet therewith, and thus, decorativeness and design may not be satisfied. On the other hand, when the thickness of the metal layer exceeds 100 nm, the influence on the decorativeness and the design may be saturated, and the production cost of the metallic decorative sheet intermediate product may be increased. Further, by configuration of the metallic decorative sheet and a backlight, decorativeness and/or design is produced by transmitting light through the metal layer. Even in this case, if the thickness of the metal layer is 10 nm to 100 nm, decorativeness, design and the like can be satisfied. Usually, the thickness of the metal layer is 50 nm. For example, in the case of a metallic decorative sheet for light ray transmission, the thickness of the metal layer can be 25 nm.

The metal layer is an important layer for providing excellent decorativeness and design, and is preferably a uniform and thin layer. For example, by the metal layer having a sea-island structure in which islands of metal particles have gaps apart from each other, the whitening phenomena or the like can be prevented when performing three-dimensional molding by deep drawing, so that metal luster can be maintained. As a method for forming such a metal layer, a vacuum deposition method, a sputtering method, or an ion plating method etc. is conceivable, and the metal layer can be formed with a usual method such as a vacuum applied technique.

(Film Layer for Holding a Metal)

The film layer to hold the metal includes the film to hold the metal, wherein the film holds the metal layer. Since the film to hold the metal is the same as the film to hold the metal according to the embodiment of the present invention, the description shall be omitted.

The film layer to hold the metal may have other features in addition to the film to hold the metal. For example, a protection film or the like may be applied to a surface of the film to hold the metal in order to keep the surface of the film to hold the metal in a clean state and prevent it from scratches and/or contamination until a second adhesive layer is laminated on the film layer to hold the metal.

The metallic decorative sheet intermediate product may include a first laminate with the film layer to hold the metal, the metal layer, and a first adhesive layer laminated in this sequence. That means, the metallic decorative sheet intermediate product may have a configuration in which the metal layer is arranged between the film to hold the metal and the first adhesive layer. For example, the first laminated may be formed by applying an adhesive to the metal layer. The film layer to hold the metal and the metal layer are as described above, and the description shall be omitted.

(First Adhesive Layer)

The first adhesive layer is a layer that bonds the metal layer and the base film layer. In the first laminate or a third laminate or a fourth laminate described below, for example, the first adhesive layer may be formed by applying an adhesive to a metal layer. In a second laminate or fourth laminate described below, the first adhesive layer may be formed e.g. by applying an adhesive to the metal layer and/or the base film layer. Further, a sheet having adhesiveness on both sides etc., such as a double-sided tape, may also be used as the first adhesive layer.

When the first adhesive layer is composed of an adhesive, it is preferable to use an adhesive having excellent adhesiveness to the metal layer and the base film layer. As such an adhesive, one resin or a mixture of two or more resins selected from polyurethane-based, polyvinyl acetate-based, ethylene vinyl acetate copolymer-based, polyvinyl alcohol-based, epoxy-based, and silicone-based resins is conceivable. For example, in view of transparency, adhesion, heat resistance that can withstand the temperature during molding, and the like, a polyurethane-based resin may be used. A method for forming the first adhesive layer with the adhesive is not particularly limited. For example, for use, solvent may be used as appropriate, or a known means such as gravure coater, reverse coater, knife coater or roll coater may be used as an emulsion to apply an appropriate amount of the adhesive to the metal layer and/or base film layer and dry it where necessary to form the first adhesive layer.

Moreover, the thickness of the first adhesive layer may be a general thickness for a metallic decorative sheet. For example, the thickness may be from 1 μm to 20 μm, and the thickness may be from 2 μm to 8 μm in view of adhesion, drying time, costs and the like.

(Other Features)

The metallic decorative sheet intermediate product may have other features in addition to the above features. For example, a mold release paper, the protection film and/or the like may be provided on a surface of the first adhesive layer in order to keep the surface of the first adhesive layer in a clean state and prevent it from contaminations until the metal layer and the base film layer are bonded together via the first adhesive layer.

Further, the metallic decorative sheet intermediate product may include a second laminate with the film layer to hold the metal, the metal layer, the first adhesive layer and the base film layer laminated in this sequence. For example, the second laminate may be formed by applying an adhesive to the metal layer and/or the base film layer and thereby bonding the metal layer and the base film layer. The film layer to hold the metal, the metal layer and the first adhesive layer are as described above, and the description shall be omitted.

(Base Film Layer)

The base film layer is a layer arranged as the lowermost layer of the metallic decorative sheet, and is capable of withstanding the temperature during molding the metallic molded product. Further, when used for a metallic molded product that does not require transparency, there is usually no particular requirement for color tone such as transparency, degree of transparency etc. as well. However, the color tone of the base film layer may affect the color tone of the metallic luster on a surface of the metallic molded product. Further, by configuration of the metallic molded product and a backlight, decorativeness and/or design may be produced by transmitting light through the metal layer. In this case, the base film layer is similarly required to have transparency. Since the total luminous transmittance and the haze as measures of the transparency are as described above, the description shall be omitted. In consideration of such influences on color tone and transparency, material for the base film layer may be selected from resins such as polyvinyl chloride-based, polyolefin-based, polystyrene-based, polyacrylic-based, polyurethane-based, polyamide-based, polycarbonate-based, and acrylonitrile-butadiene-styrene copolymer-based resins as appropriate depending on the application in consideration of the heat resistance against the temperature during molding, compatibility with an injection molding resin for insert injection molding, with an extrusion resin for extrusion lamination or the like.

For example, as a base film layer used for a metallic molded product that does not require transparency, a base film layer with an acrylonitrile-butadiene-styrene copolymer-based resin as its raw material may be used.

Further, as the base film layer used also for a metallic molded product requiring transparency, a base film layer with a polycarbonate-based and/or acrylic-based resin having excellent transparency and high injection adhesion may be used.

The thickness of the base film layer may be a general thickness of a metallic decorative sheet, for example, from 50 μm to 1000 μm. When the thickness of the base film layer is less than 50 μm, defects such as wrinkles may easily occur when laminating the film layer to hold the metal and the second adhesive layer, and the metallic decorative sheet may be easily broken during molding processing the metallic molded product. On the other hand, when the thickness of the base film layer exceeds 1000 μm, the moldability of the metallic molded product may be reduced.

(Other Features)

The metallic decorative sheet intermediate product may have other features in addition to the above features. For example, a mold release paper, a protection film and/or the like may be provided on a surface of the film layer to hold the metal in order to keep the surface of the film layer to hold the metal in a clean state and prevent it from scratches and/or contaminations until the adhesive is applied to the film layer to hold the metal.

In addition, the metallic decorative sheet intermediate product may include a third laminate with a protection film layer having transparency, the second adhesive layer, the film layer to hold the metal, the metal layer, and the first adhesive layer laminated in this sequence. For example, the third laminate may be formed by applying an adhesive to the protection film layer and/or the film layer to hold the metal to bond the protection film layer and the film layer to hold the metal together, and further applying an adhesive to the metal layer. The film layer to hold the metal, the metal layer, and the first adhesive layer are as described above, and the description shall be omitted.

(Protection Film Layer)

The protection film layer is a layer arranged as the uppermost layer of the metallic decorative sheet, has transparency so that the metal layer is visible, and is capable of withstanding the temperature during molding the metallic molded product. Since the total luminous transmittance and the haze as measures of the transparency are as described above, the description is shall be omitted.

The protection film layer may contain various dyes, pigments and/or the like in order to adjust transparency, color tone, etc., and may be dyed with a dye. Furthermore, desired printing may be previously performed on the protection film layer. In this case, the printing can be performed on a surface of the protection film layer that is exposed to the outside. However, the durability of the printing can be increased by printing on a surface that is opposed to the surface exposed to the outside and contacts the second adhesive layer.

As the material of the protection film layer, e.g. polyvinyl chloride-based, polyolefin-based, polystyrene-based, poly-acryl-based, polyurethane-based, polyamide-based, and polycarbonate-based resins may be conceivable. From these resins, the material of the protection film layer may be selected as appropriate in consideration of transparency, heat resistance to the temperature during molding, economy and the like.

For example, an acrylic-based resin film such as polymethyl methacrylate (PMMA) may be used as the protection film layer in view of ability to obtain a molded product with excellent expressiveness as a surface of the metallic molded product and abrasion resistance. In this case, excellent moldability can be obtained for molding the metallic molded product. In addition, it is not necessary to provide a hard coat layer on a surface of the metallic molded product after molding which can reduce costs. Further, even when applied to a molded product with a large drawing, high abrasion resistance can be obtained across the entire surface of the metallic molded product.

In case that it is desired to provide excellent weather resistance to the molded product simultaneously in addition to the above-described effects achieved when an acrylic-based resin film is used, an alloy film of an alloy film with fluorine-based resin and an acrylic-based resin, or a dual-layer film comprised of a fluorine-based resin layer and an acrylic-based resin layer may be used to address it.

However, it is to be noted that the adhesion may be poor when such an alloy film is used. When it is desired to obtain high adhesiveness, a composite alloy film may be used which is composed of an alloy film including a fluorine-based resin with high fluororesin content and acrylic-based resin, and an alloy film including a fluorine-based resin with low fluororesin content and arylic-based resin. Then, good adhesion of the acrylic-based resin and excellent weather resistance of the fluorine-based resin can be simultaneously achieved in the composite alloy film by providing the second adhesive layer on a side of the alloy film including the fluorine-based resin with low fluororesin content and the acrylic-based resin. Further, when the acrylic-based resin film is used as the protection film layer, high scratch resistance is obtained.

In addition, since a polycarbonate-based resin has excellent transparency, heat resistance, impact resistance and moldability and high adhesion, it may be used as a material for the protection film layer.

Usually, the thickness of the protection film layer is preferably 10 μm or more, and more preferably 25 μm or more in view of handleability. On the other hand, in consideration of moldability, flexibility and economy, the thickness of the protection film layer is preferably 300 μm or less. Generally, a protection film with a thickness of 75 μm to 125 μm may be used.

(Second Adhesive Layer)

The second adhesive layer is a layer that bonds the protection film layer to the film layer to hold the metal. In the third laminate and/or the fourth laminate, for example, the second adhesive layer may be formed by applying an adhesive to the protection film layer and/or the film layer to hold the metal. Further, a sheet having adhesiveness on both sides etc., such as a double-sided tape, may also be used as the second adhesive layer. Further, the second adhesive layer may be colored. In order to adjust the transparency and color tone of the second adhesive layer, various dyes, pigments and/or dyes may be contained, and metal powder, metal foil powder and/or mica may be also contained.

When the second adhesive layer is composed of an adhesive, it is preferable to use an adhesive which has excellent adhesion to the protection film layer and the film layer to hold the metal layer and has transparency so that the metal layer can be visually recognized. Furthermore, in the case of an outdoor application, it is preferable to use an adhesive having excellent weather resistance. Since the total light luminous transmittance and the haze as measures of the transparency are as described above, the description is shall be omitted. As such an adhesive, one resin or a mixture of two or more resins selected from polyurethane-based, polyvinyl acetate-based, ethylene vinyl acetate copolymer-based, epoxy-based, and silicone-based resins is conceivable. For example, in view of transparency, adhesion, heat resistance that can withstand the temperature during molding, weather resistance and the like, a non-yellowing type of polyurethane-based resin may be used. A method for forming the second adhesive layer with the adhesive is not particularly limited. For example, for use, solvent may be used as appropriate, or a known means such as gravure coater, reverse coater, knife coater or roll coater may be used as an emulsion to apply an appropriate amount of the adhesive to the protection film layer and/or film layer to hold the metal and dry it where necessary to form the second adhesive layer.

In addition, the thickness of the second adhesive layer may be a general thickness for a metallic decorative sheet. For example, the thickness may be from 1 μm to 20 μm, and the thickness may be from 2 μm to 8 μm in consideration of adhesion, transparency, drying time, costs and the like.

Various dyes, pigments and the like may be added to the second adhesive layer, and the degree of transparency, color tone and the like may be adjusted. Further, metal powder, metal foil powder, mica and the like may be added.

(Other Features)

The metallic decorative sheet intermediate product may have other features in addition to the above features. For example, a protection film or the like may be provided on a surface of the first adhesive layer in order to keep the surface of the first adhesive layer in a clean state and prevent it from contaminations until the metal layer and the base film layer are bonded via the first adhesive layer. Additionally, a scratch-resistant layer comprised of an acrylic-based resin or the like for improving the scratch resistance of the metallic decorative sheet, an adhesive layer for laminating the scratch-resistant layer and the like may be laminated.

[Metallic Decorative Sheet]

A metallic decorative sheet according to one embodiment of the present invention includes a fourth laminate with a protection film layer having transparency, a second adhesive layer, a film layer to hold the metal including the film to hold the metal, wherein the film holds the metal layer, the metal layer, a first adhesive layer, and a base film layer laminated in this sequence. The protection film layer, the second adhesive layer, the film layer to hold the metal, the metal layer, the first adhesive layer, and the base film layer are as described above, and description shall be omitted.

(Other Features)

The metallic decorative sheet may have other features in addition to the above features. For example, a protection film or the like may be provided on a surface of the protection film layer and/or base film layer to keep the surface of the protection film layer and/or base film layer in a clean state and to prevent it from contamination until a molded product is manufactured using the metallic decorative sheet. Additionally, a scratch-resistant layer comprised of an acrylic-based resin or the like for improving the scratch resistance of the metallic decorative sheet, an adhesive layer for laminating the scratch-resistant layer and the like may be laminated.

The metallic decorative sheet, in combination with the backlight, may produce decorativeness and design by transmitting light through the metal layer. In such a case, the metallic decorative sheet is required to be transparent. Since the total luminous transmittance and the haze as measures of the transparency are as described above, the description shall be omitted.

The metallic decorative sheet may be formed using the above-described metallic decorative sheet intermediate product. For example, it is possible to apply an adhesive to the metal layer and the film layer to hold the metal and to laminate the protection film layer and the base film layer together to form the fourth laminate, in order to form the metallic decorative sheet. Further, it is also possible to laminate the protection film layer to the first laminate and then apply an adhesive to the film layer to hold the metal and/or base film layer to laminate the film layer to hold the metal and the base film layer together so that the metallic decorative sheet may be formed. Also when using a second laminate or a third laminate, the metallic decorative sheet may be formed with a process similar to that of the first laminate.

Moreover, it is possible to form the metallic decorative sheet without using the above-described metallic decorative sheet intermediate product. For example, it is possible to apply an adhesive to the protection film layer and the film layer to hold the metal and to laminate these layers together, then form the metal layer, and to apply an adhesive to the metal layer and/or base film layer to laminate these layers together so that the metallic decorative sheet may be formed.

FIG. 1 is a schematic diagram illustrating a cross section of a metallic decorative sheet according to an embodiment of the present invention. The metallic decorative sheet 100 includes a fourth laminate 40 with a protection film layer 1, a second adhesive layer 2, a film layer to hold a metal 3, a metal layer 4, a first adhesive layer 5, and a base film layer 6 which are laminated. A first laminate 10 included in the metallic decorative sheet intermediate product is formed by laminating the film layer to hold the metal 3, the metal layer 4 and the first adhesive layer 5 in this sequence, wherein the metallic decorative sheet 100 may be formed by using the first laminate 10 as an intermediate product and combining it additionally with the protection film layer 1, a second adhesive layer 2 and the base film layer G.

Further, a second laminate 20 included in the metallic decorative sheet intermediate product has the film layer to hold the metal 3, the metal layer 4, the first adhesive layer 5 and the base film layer 6 which are laminated in this sequence, wherein the second laminate 20 may be formed e.g. by combining the first laminate 10 with the base film layer G. Furthermore, the metal decorative sheet 100 may be formed by using the second laminate 20 as an intermediate product and further combining the protection film layer 1 with the second adhesive layer 2.

In the same manner as described above, a third laminate 30 included in the metallic decorative sheet intermediate product has the protection film layer 1, the second adhesive layer 2, the film layer to hold the metal 3, a metal layer 4 and the first adhesive layer 5 which are laminated in this sequence, wherein the third laminate 30 may be formed for example by combining the first laminate 10 with the protection film layer 1 and the second adhesive layer 2. Further, the metallic decorative metal sheet 100 may be formed by using the third laminate 30 as an intermediate product and further combining it with the base film layer G.

[Extruded Laminate Product]

An extruded laminate product according to one embodiment of the present invention includes the protection film layer and/or base film layer of the metallic decorative sheet with a resin sheet laminated thereon. The extruded laminate product may be further processed to produce a carryback, a suitcase and the like. The metallic decorative sheet, the protection film layer and the base film layer are as described above, and the description shall be omitted.

The resin sheet with a thickness of 100 μm to 500 μm may be used. Further, as a material for the film, a thermoplastic resin may be used, specifically polyethylene, polypropylene, polyvinyl chloride, polystyrene, polyvinyl acetate, polyurethane, polytetrafluoroethylene, polymethyl methacrylate, acrylonitrile butadiene styrene, polyamide, polycarbonate, polyester, polyimide and the like may be used alone or in combination.

An adhesive layer may be provided between the protection film layer and/or the base film layer and the resin sheet.

[Method for Producing Extruded Laminate Product]

A method for producing an extruded laminate product according to one embodiment of the present invention includes a laminating step of laminating a molten resin sheet on the protection film layer and/or the base film layer of a metallic decorative sheet. The metallic decorative sheet, the protection film layer and the base film layer are as described above, and the description shall be omitted.

The laminating step can be performed by an extrusion laminating method using an extrusion laminating machine. For example, the above-mentioned thermoplastic resin may be put into an extruder and melted, and the molten resin may be extruded into a T-die to form a molten resin film in the T-die, wherein the molten resin film may be laminated to the protection film layer and/or the base film layer in a lamination section to form a laminate. After the laminating step, the laminate may be cooled and rolled up to form a roll.

[Metallic Molded Product]

A metallic molded product according to an embodiment of the present invention includes a molded product of a metallic decorative sheet according to an embodiment of the present invention. The metallic decorative sheet is as described above, and the description shall be omitted.

The metallic molded product is produced from a metallic decorative sheet by the following production method, for example, and is formed into a desired shape depending on the purpose. For example, the metallic molded product may be applied to smartphones, cell phone housings, door mirror housings for automobiles, front grills, door handles, center wheel caps, emblems, ornaments, garnishes, lamp reflectors, center consoles, instrument panels or the like, casings and/or decorative parts for personal computers, TVs and/or home appliances, casings and/or decorative parts for pachinko machines, pachislots and/or game machines, or to carry bags and suitcases as general applications etc. in order to provide metallic decorativeness and/or design as a substitute for plating or metal materials.

(Other Features)

The metallic molded product may have other features in addition to the above features. For example, a mold release paper, a protection film and/or the like may be provided on a surface of the protection film layer and/or the base film layer in order to keep the surface of the protection film layer and/or the base film layer in a clean state and prevent it from contamination until use of the metallic decorative sheet is started.

The metallic molded product, in combination with the backlight, may produce decorativeness and design by transmitting light through the metal layer. In such a case, the metallic molded product is required to be transparent. Since the total luminous transmittance and the haze as measures of the transparency are as described above, the description shall be omitted.

[Injection Molded Product]

An injection molded product according to one embodiment of the present invention includes a resin layer injection-molded on the surface of a base film layer of a metallic molded product. The injection molded product may be further processed to be used for smartphones, cell phone housings, door mirror housings for automobiles, front grilles, door handles, center wheel caps, emblems, ornaments, garnishes, lamp reflectors, center consoles, instrument panels or the like, for housings and/or decorative parts of personal computers or TVs and home appliances. The metal molded product and the base film layer are as described above, and the description shall be omitted.

The thickness of the resin layer is not particularly limited, but may be, for example, from 100 μm to 20 mm. Further, as the resin layer, a resin layer containing a thermoplastic resin can be used, specifically, polyethylene, polypropylene, polyvinyl chloride, polystyrene, polyvinyl acetate, polyurethane, polytetrafluoroethylene, polymethyl methacrylate, acrylonitrile butadiene styrene, polyamide, polycarbonate, polyester, polyimide and the like may be used alone or in combination.

A method for producing an injection molded product according to one embodiment of the present invention includes an injection molding step of injecting a resin by using an injection molding die, between a surface of a base film layer of a metallic molded product obtained by the method for producing metallic molded product and the injection molding die to form a resin layer and thereby obtaining a molded product with the metallic molded product being integrated with the resin layer. The metallic molded product and the base film layer are as described above, and the description shall be omitted.

The injection molding step may be performed using a general injection molding machine. As the used resin, a thermoplastic resin may be used, specifically, polyethylene, polypropylene, polyvinyl chloride, polystyrene, polyvinyl acetate, polyurethane, polytetrafluoroethylene, polymethyl methacrylate, acrylonitrile butadiene styrene, polyamide, polycarbonate, polyester, polyimide and the like may be used alone or in combination. Such a resin may be melted and injected between the surface of the base film layer and the injection molding die to form a resin layer.

Further, the method for producing an injection molded product may further include a trimming step of trimming the metallic molded product into an arbitrary shape before the injection molding step, a cooling step of cooling the molded product after the injection molding step, a removal step of removing the molded product from the injection molding die after the cooling step.

[Method for Producing Metallic Molded Product]

A method for producing a metallic molded product according to one embodiment of the present invention includes a molding step of fitting the metallic decorative sheet with a surface temperature of 160° C. to 215° C. to a mold in order to obtain the molded product.

(Molding Step)

With the surface temperature of the metallic decorative sheet being from 160° C. to 215° C. for thermoforming the metallic decorative sheet, the metallic decorative sheet is not drawn down or no whitening phenomena or the like occurs during molding, so that good moldability can be satisfied. If the surface temperature is less than 160° C., the metallic decorative sheet may be difficult to process and/or mold due to the metallic decorative sheet being not softened sufficiently and/or due to the metallic decorative sheet hanging down because of drawdown phenomenon and being thereby deformed. Furthermore, if the surface temperature exceeds 215° C., the metallic decorative sheet may be in a molten state and may be too soft to be easily formed, or may be susceptible to whitening phenomena or the like. If the surface temperature is 170° C. to 210° C., it is easier to handle the metallic decorative sheet, and the yield of the metallic molded product can be maintained at a high level.

In the metallic decorative sheet, in addition to the film layer to hold the metal layer, the protection film layer, the base film layer, the first adhesive and the like as well as the second adhesive layer contain a resin as a main component. Therefore, while occurrence of the drawdown and the whitening phenomena or the like are greatly affected by the film to hold the metal, it is additionally affected by other layers, and are caused by the combined heat resistance capacity of these layers.

For example, in case that a thermoplastic resin having crystallinity is used for the film layer to hold the metal layer, the thermoplastic resin can satisfy excellent moldability as the metallic decorative sheet at 160° C. or higher. Further, the thermoplastic resin is melted above 215° C., and the film layer to hold the metal layer may not be able to effectively hold the metal layer, wherein the whitening phenomena or the like may be caused by aggregation and/or scattering of metal particles of the metal layer or the like.

The shape of the mold to which the metallic decorative sheet is fitted can be any shape which allows the metallic molded product to be molded into a desired shape. For example, a die such as a male mold or a female mold with brass which has a chromium-plated surface may be used. Further, the temperature of the mold may be set to any temperature in consideration of control of the surface temperature of the metallic decorative sheet and control of the cooling condition of the metallic molded product after the molding step.

As a method for fitting the metallic decorative sheet to the mold, any method such as straight molding using a female mold, drape molding using a male mold, and plug assisted molding using a plug (auxiliary mold) may be adopted in consideration of the easy moldability and/or costs of molding. Furthermore, a vacuum forming method in which the metallic decorative sheet is sucked to the mold, or a compressed air forming method in which the metallic decorative sheet is fitted to the mold by compressed air pressure may be employed. For example, by fitting the metallic decorative sheet to the mold with vacuum and/or compressed air, the adhesion between the metallic decorative sheet and the mold is increased, so that processing into a more precise shape is possible.

(Clamping Step) A method for producing a metallic molded product according to one embodiment of the present invention may include a clamping step of clamping a metallic decorative sheet before the molding step. With this step, it is possible to adjust and fix the metallic decorative sheet so as not to be loosened during molding. Clamping can be performed, for example by gripping both ends of the sheet e.g. using a plurality of gripping means capable of gripping both sides of the metallic decorative sheet. Gripping the sheet is not limited to gripping both ends of the sheet, and any part of the sheet may be gripped. Usually, when continuously producing metallic molded products, both ends of the metallic decorative sheet in a width direction may be gripped. Further, when metallic molded products are batch-produced by using quadrilateral-shaped sheets which are formed by cutting the metallic decorative sheet to a predetermined length, ends of the four sides may be gripped by upper and lower frames.

(Heating Step)

Furthermore, a method for producing a metallic molded product according to one embodiment of the present invention may include a heating step of heating the metallic decorative sheet after the clamping step. For example, after clamping the metallic decorative sheet with room temperature and adjusting it so that it is not loosened, a plurality of heaters or the like may be used as heating means to heat both sides of the sheet simultaneously and uniformly with the heaters or the like being arranged above and below the sheet. With this heating step, the surface temperature of the metallic decorative sheet can be controlled to 160° C. to 215° C.

(Other Steps)

The method for producing a metallic molded product may include further steps in addition to the above steps. For example, the method may include an applying step of applying a protection film or the like to a surface of the protection film layer or the base film layer in order to maintain the surface of the protection film layer and/or the base film layer in a clean state until the metallic molded product is processed in the next step. Additionally, after inserting the metallic decorative sheet into the injection molding die, insert injection molding may be performed in which a resin is injected to decorate a surface of the injection molded product.

Figure 2:
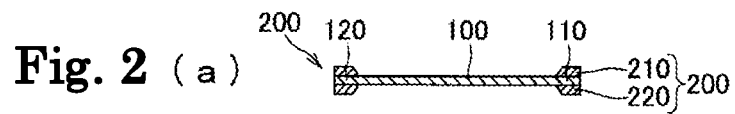
FIGS. 2a to 2e shows a schematic cross sectional view illustrating a production device for a metallic molded product and a metallic decorative sheet for the purpose of explaining an example for a method for producing a metallic molded product according to an embodiment of the present invention.
Figure 2:
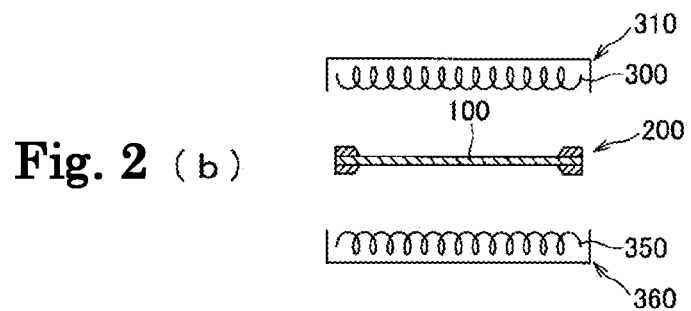
Figure 2:
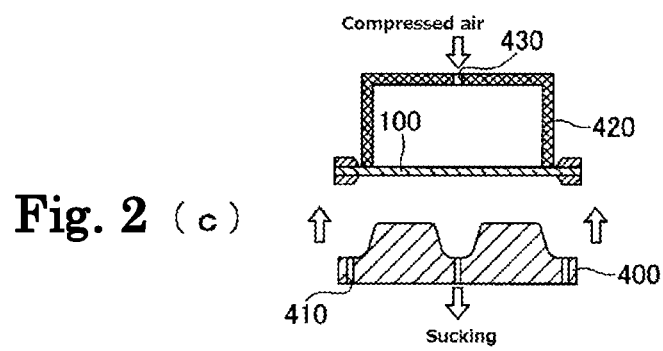
Figure 2:
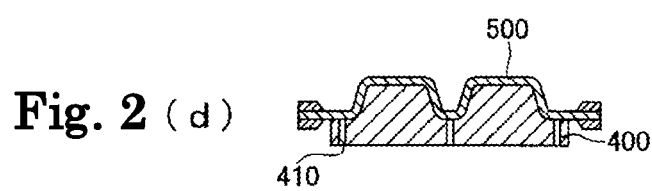
Figure 2:
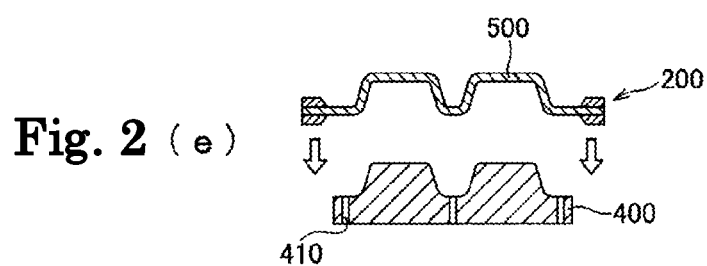

Hereinafter, a method for producing a metallic molded product according to one embodiment of the present invention will be described with reference to FIGS. 2a to 2e. FIG. 2 shows a schematic cross sectional view illustrating a production device for a metallic molded product and a metallic decorative sheet.

First, in the clamping step, a first end 110 and a second end 120 of the metallic decorative sheet 100 are clamped by using a plurality of clamps 200 including a first clamp portion 210 and a second clamp portion 220 to clamp it with the first clamp portion 210 and the second clamp portion 220 (FIG. 2a).

Next, in the heating step, a first heater 310 with a first heat generating body 300 and a second heater 360 with a second heat generating body 350 which are arranged above and below the clamped metallic decorative sheet 100, wherein the heaters are controlled so that the metallic decorative sheet 100 has a uniform temperature (FIG. 2b).

In the molding step, a die 400 is lifted from below the heated metallic decorative sheet 100 and fitted thereto, followed by vacuum forming, compressed air forming or both (vacuum-compressed air forming), wherein in the vacuum forming, air is sucked through suction holes 410 to suck the metallic decorative sheet 100 to the die 400, wherein in the compressed air forming, a compressed air box 420 is lowered from above the metallic decorative sheet 100 and brought into contact therewith, followed by introducing compressed air from the outside via a compressed air hole 430 to fit the metallic decorative sheet 100 to the die 400 by means of compressed air pressure (FIG. 2c). In this case, by pressing a plug against the metallic decorative sheet 100 from above to assist the vacuum forming, unevenness of the sheet can be suppressed which enables more precise forming in details. By the metallic decorative sheet 100 fitted to the die 400, a metallic molded product 500 is formed (FIG. 2d).

After the metallic molded product 500 is formed, the metallic molded product 500 may be cooled by using natural cooling or cooling air to stabilize the shape. Then, in a mold release step, the die 400 is lowered to remove the metallic molded product 500 from the die 400 (FIG. 2e).

Examples

Hereinafter, the present invention will be described more specifically with reference to examples, but the present invention is not limited to the following examples.

[Production of Metallic Decorative Sheet]

Films to hold metal layers A to E shown in Table 1 were used to produce metallic molded products according to a procedure shown in the following items (Holding a metal layer) to (Forming a protection film layer).

The films to hold the metal layers A and B are both polyethylene terephthalate (PET) modified with neopentyl glycol, while the film to hold the metal layer C is polyethylene terephthalate modified with 2,6-naphthalenedicarboxylic acid and 1,4-cyclohexanedimethanol. The films to hold the metal layers D and E are unmodified polyethylene terephthalate.

Figure 3:
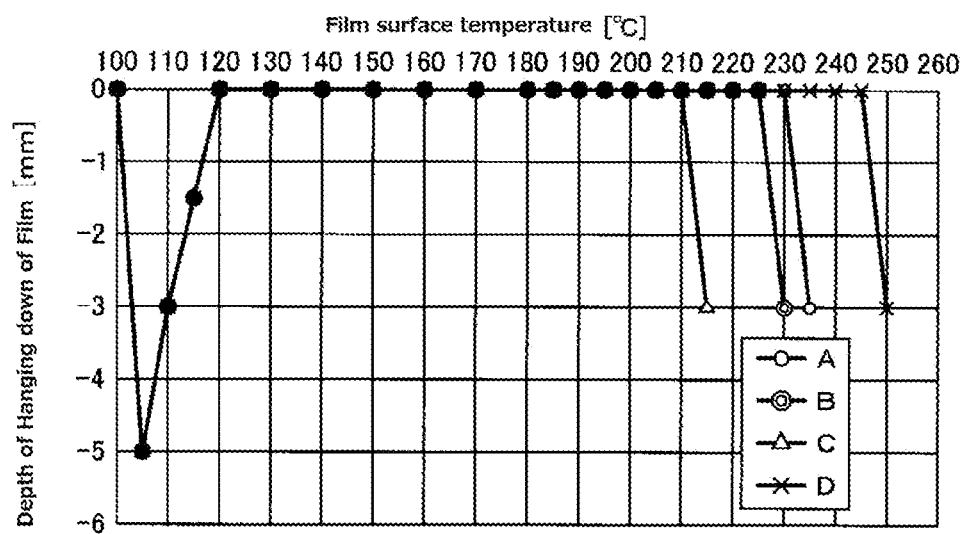
FIG. 3 is a graph regarding films to hold metal layers A-D, illustrating results obtained by measuring a hanging state of the films which vary depending on surface temperatures.

Here, a "temperature difference" shown in Table 1 is a "temperature difference between the temperature at which each film recovers from the drawdown and the temperature at which it starts to hang down due to melting". This temperature difference is determined for the films to hold the metal layers A to E by performing a clamping step and a heating step in [Production of a metallic molded product] as shown below and then measuring changes in a surface temperature of each film and the hanging state of the film A graph according to FIG. 3 shows the results obtained by measuring the hanging state of the films to hold the metal layers A to D, which changes depending on the surface temperature. The measurement of the surface temperature of the films was performed starting from 100° C. Each film A-D drew down from 100° C., began to recover from 110° C., and recovered from drawdown at 120° C. Thereafter, each of the films A to D remained in a state where the film was tensed, and when a temperature slightly lower than the melting point of the films were reached, the films started to hang down due to melting. For example, film C started to hang down at 210° C., film B at 225° C., film A at 230° C., and film D at 245° C. In Table 1, the temperature at which recovery from the drawdown occurred is indicated as "recovery temperature", and the temperature at which the hang down is started due to melting is indicated as "hang-down start temperature".

A glass transition temperature, melting point and crystallization temperature shown in Table 1 were measured according to JIS K7121 using a differential scanning calorimeter (DSC). The haze was measured by means of a haze meter according to JIS K 7136, and the total luminous transmittance was measured by means of a haze meter according to JIS K 7361.

TABLE 1

| Film number | Films to hold metal layers | | | | |
|---|---|---|---|---|---|
| | A | B | C | D | E |
| Polymer type | Modified PET | Modified PET | Modified PET | PET | PET |
| Film thickness (μm) | 25 | 25 | 25 | 75 | 38 |
| Glass transition temperature (° C.) | 80 | 70 | 65 | — | — |
| Melting point (° C.) | 243 | 235 | 216 | 256 | 257 |
| Crystallization temperature (° C.) | 163 | 151 | 147 | 190 | 197 |
| Recovery temperature (° C.) | 120 | 120 | 120 | 120 | 120 |
| Hang-down start temperature (° C.) | 230 | 225 | 210 | 245 | 245 |
| Temperature difference (° C.) | 110 | 105 | 90 | 125 | 125 |
| Appearance | Colorless and transparent | Colorless and transparent | Colorless and transparent | Colorless and transparent | Colorless and transparent |
| Haze | 0.7 | 1.1 | 1.5 | 4.2 | 5.3 |
| Total luminous transmittance (%) | 89.5 | 88.5 | 89.1 | 87.3 | 88.4 |

(Holding a Metal Layer)

With a vacuum deposition method, indium with purity of 99.99% was applied to one side of each of the films to hold the metal layers A to E, and indium layers with a thickness of 40 nm as the metal layer was held by the films to hold the metal layers A to E to obtain metallic decorative sheets.

(Forming First Adhesive Layer and Base Film Layer)

On a surface of the metal layer, polyurethane (PU)-based adhesive (main agent: polyol (Takelac A-1143, manufactured by Mitsui Chemicals), curing agent: isocyanate (Takenate A-3, manufactured by Mitsui Chemicals), and ethyl acetate as a solvent were used) was applied, the solvent was dried, and then, a base film layer made of a polycarbonate (PC)-based resin film (Shinetech PC11U manufactured by Shine Techno Co., 125 μm thick) or acrylonitrile-butadiene-styrene copolymer synthetic resin (ABS) film (BS100 manufactured by JNC, 250 μm thick) was applied to the metal layer via an adhesive. With this step, a first adhesive layer with a thickness of 5 μm and a base film layer with a thickness of 125 μm or 250 μm were formed to obtain a second laminate.

(Forming a Second Adhesive Layer and a Protection Film Layer)

On a surface of the film to hold the metal layer, polyurethane (PU)-based adhesive (main agent: polyol (TM-K51, manufactured by Toyo Morton Co., Ltd.), curing agent: isocyanate (CAT-RT-85, manufactured by Toyo Morton Co., Ltd.) and ethyl acetate as a solvent were used) was applied, the solvent was dried, and then, a protection film layer made of a polycarbonate (PC)-based resin film (Shinetech PC11U manufactured by Shine Techno Co., Ltd., 125 μm thick) or a polymethyl methacrylate (PMMA)-based resin film (Technoloy S001G, manufactured by Sumitomo Chemical Co., Ltd., 75 μm thick) was applied to the film to hold the metal layer via an adhesive. With this step, a second adhesive layer with a thickness of 5 μm and a protection film layer with a thickness of 75 μm or 125 μm were formed to obtain a metallic decorative sheet including a fourth laminate (Examples 1 to 6, Comparative Examples 1 to 4).

Table 2 shows the configuration of each layer of the metallic decorative sheets produced with the above steps.

TABLE 2

| | Metallic decorative sheet | | | | | |
|---|---|---|---|---|---|---|
| | Example 1 | Example 2 | Example 3 | Example 4 | Example 5 | Example 6 |
| Protection film layer | PMMA | PC | PMMA | PMMA | PC | PMMA |
| Second adhesive layer | PU | PU | PU | PU | PU | PU |
| Film number of film to hold a metal layer | A | A | A | B | B | B |
| Metal layer | In | In | In | In | In | In |
| First adhesive layer | PU | PU | PU | PU | PU | PU |
| Base film layer | ABS | PC | PC | ABS | PC | PC |

TABLE 3

| | Metallic decorative sheet | | | |
|---|---|---|---|---|
| | Comparative Example 1 | Comparative Example 2 | Comparative Example 3 | Comparative Example 4 |
| Protection film layer | PMMA | PC | PMMA | PMMA |
| Second adhesive layer | PU | PU | PU | PU |
| Film number of film to hold a metal layer | C | C | D | E |
| Metal layer | In | In | In | In |
| First adhesive layer | PU | PU | PU | PU |
| Base film layer | ABS | PC | ABS | ABS |

[Production of Metallic Molded Product]

By means of a vacuum-compressed air forming machine ("KD20/25" manufactured by Kiefel) and based on the procedure shown in FIG. 2, the metallic decorative sheets according to Examples 1 to 6 and Comparative Examples 1 to 4 produced as described above were thermoformed to produce metallic molded products.

(Clamping Step)

The roll-shaped metallic decorative sheet was cut into 350 mm×300 mm, and the sheet was sandwiched from above and below by a clamping frame of the vacuum-compressed air forming machine, and four sides of the sheet were gripped so as not to cause loosening by their own weight.

(Heating Step)

After the clamping step, the metallic decorative sheet was moved to the heating section of the vacuum-compressed air forming machine, and heaters each having nine heat generating bodies were arranged above and below the metallic decorative sheet, and then the metallic decorative sheet was heated uniformly. During the heating step, the metallic decorative sheet was observed in a horizontal direction to evaluate the behavior of hanging of the sheet due to heating.

(Molding Step)

After heating until the surface temperature of the metallic decorative sheet reached a temperature allowing molding, the metallic decorative sheet was moved to a molding section of the vacuum-compressed air forming machine. Then, a male die with a chromium-plated brass surface located at a lower portion of the molding section was lifted and fitted to the metallic decorative sheet, and thereafter, a metallic molded product was obtained by vacuum treatment and compressed air treatment. In this molding step, two temperatures of 175° C. and 205° C. were selected as criteria for the moldable temperature, and the molding step was performed for two cases with the surface temperature of the metallic decorative sheet at start of forming in the molding section of 175° C. and 205° C., respectively.

(Mold Releasing Step)

After forming, the die was lowered to release the metallic decorative sheet from the die.

Figure 4:
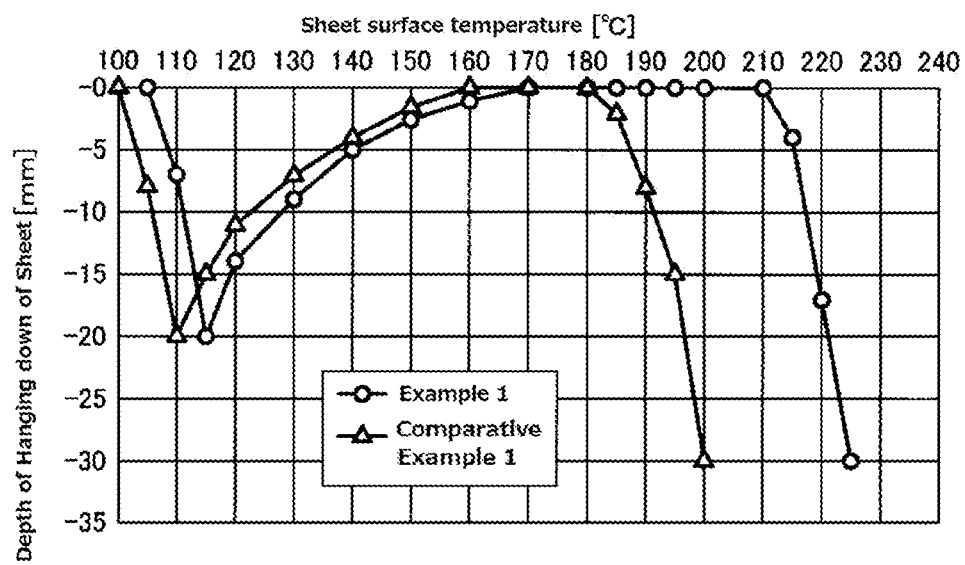
FIG. 4 is a graph regarding metallic decorative sheets according to Example 1 and Comparative Example 1, illustrating results obtained by measuring a hanging state of the films which vary depending on surface temperatures.
Figure 5:
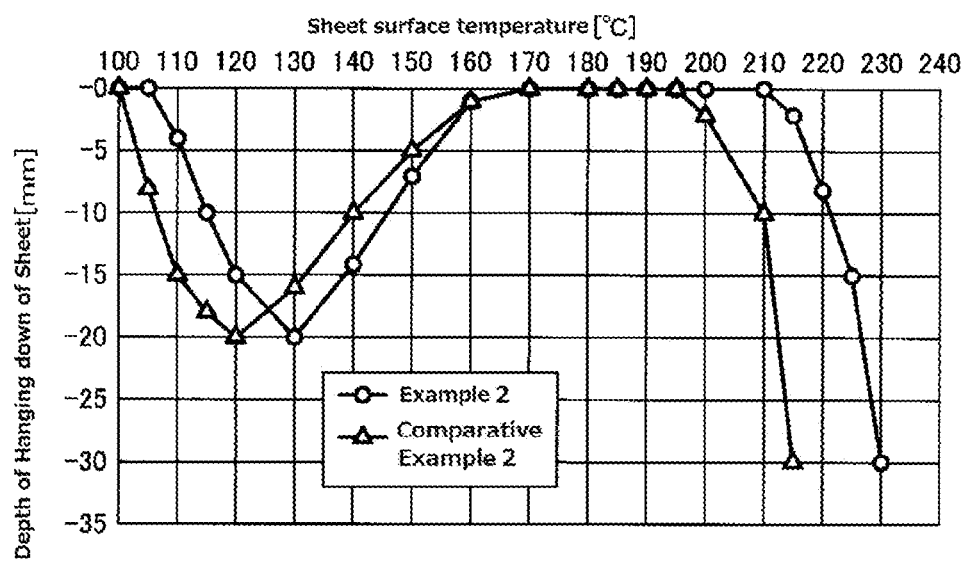
FIG. 5 is a graph regarding metallic decorative sheets according to Example 2 and Comparative Example 2, illustrating results obtained by measuring a hanging state of the films which vary depending on surface temperatures.

After the mold releasing step, the metallic molded product was removed from the vacuum-compressed air forming machine, and the finishing property was then evaluated. Tables 4 and 5 show results obtained by evaluating the behavior of the metallic decorative sheets according to Examples 1 to 6 and Comparative Examples 1 to 4 by heating and the finishing property of the metallic molded products. In the evaluation of the finishing property according to Tables 4 and 5, ○ was given for the metallic decorative sheets with which a shape of the molded product had no problem and the decorativeness and the design were good so that the finishing property was good, while x was given for the metallic decorative sheets with which any of the shape, the decorativeness and the design of the molded product had a problem and the finishing property was poor. Further, FIG. 4 shows results obtained for the metallic decorative sheets according to Example 1 and Comparative Example 1 by measuring a hanging state of the sheet which changes depending on the surface temperature Similarly, FIG. 5 shows results obtained for the metallic decorative sheets according to Example 2 and Comparative Example 2 by measuring the hanging state of the sheets, which changes depending on the surface temperature.

TABLE 4

| | | Metallic decorative sheet | | | | | |
|---|---|---|---|---|---|---|---|
| | | Example 1 | Example 2 | Example 3 | Example 4 | Example 5 | Example 6 |
| Recovery temperature (° C.) | | 170 | 170 | 170 | 170 | 170 | 170 |
| Hang-down start temperature (° C.) | | 210 | 210 | 210 | 210 | 210 | 210 |
| Temperature difference (° C.) | | 40 | 40 | 40 | 40 | 40 | 40 |
| Finishing property of the molded product | 175° C. | ○ | ○ | ○ | ○ | ○ | ○ |
| | 205° C. | ○ | ○ | ○ | ○ | ○ | ○ |

TABLE 5

| Metallic decorative sheet | | Comparative Example 1 | Comparative Example 2 | Comparative Example 3 | Comparative Example 4 |
|---|---|---|---|---|---|
| Recovery temperature (° C.) | | 160 | 170 | 200 | 200 |
| Hang-down start temperature (° C.) | | 180 | 195 | 220 | 220 |
| Temperature difference (° C.) | | 20 | 25 | 20 | 20 |
| Finishing property of the molded product | 175° C. | ○ | ○ | X | X |
| | 205° C. | X | X | X | X |

Figure 6:
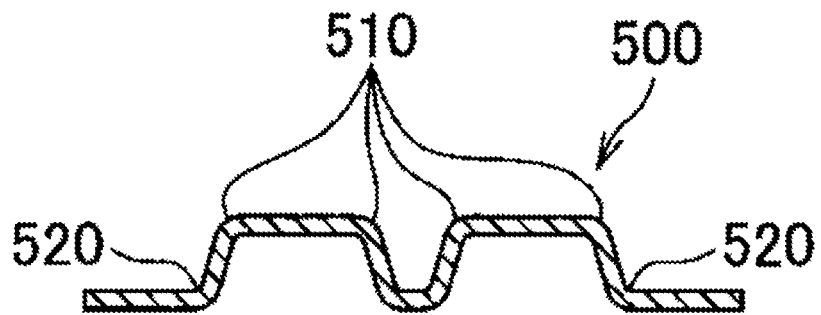
FIG. 6 shows a schematic cross sectional view illustrating a metallic molded product.

FIG. 6 shows a schematic cross sectional view illustrating a produced metallic molded product 500. In thermoforming, the behavior of the film layer to hold the metal which holds the metal layer due to heating may affect the finish property of the molded product. For example, when the film to hold the metal melts and exhibits flowability, the smoothness of the metal layer may be impaired due to aggregation or dispersion of metal particles due to the surface energy or the like. When the smoothness of the metal layer is impaired, light incident on the molded product is scattered, and the whitening phenomenon or the like occurs. The whitening phenomenon and the like tends to occur easily in a portion where the shape changes, such as a protruding corner 510 and a recessed corner 520 of the metallic molded product 500. Moreover, the whitening phenomenon may occur in a flat portion in addition to the protruding corner 510 and the recessed corner 520 of the metallic molded product 500.

As shown in FIGS. 4 and 5, even if the metallic decorative sheet is adjusted so as not to generate wrinkles or looseness due to its own weight with the clamping step, looseness occurs in a drawdown state or a molten state due to heating. For example, even when the same film is used as the film layer to hold the metal layer, the behavior of temperature change of the metallic decorative sheet varied due to the difference in resin of the protection film layer and the base film layer (FIGS. 4 and 5).

However, it was common for the metallic decorative sheets according to Examples 1 and 2 that they were drawn down in a temperature range from 105° C. to less than 170° C., and that they are in a hanging down state above 210° C. (FIGS. 4 and 5). On the other hand, the metallic decorative sheet according to Comparative Example 1 and the metallic decorative sheet according to Comparative Example 2 have different resins of the protection film layer and the base film layer, and the temperature range of the drawdown state and the temperature at which hanging down starts (FIGS. 4 and 5).

Since in the drawn down state of the metallic decorative sheet, the forming will be apparently obstructed by loosening, the molding step is conducted under the condition where the metallic decorative sheet has recovered from the drawdown and thus the loosening has been improved. Further, in a molten and hanging down state of the metallic decorative sheet, the molding step is suspended in order to prevent the forming from being obstructed by the loosening and/or the occurrence of the whitening phenomena or the like. According to Examples 1 and 2, 170° C. to 210° C. is a criterium for conducting the forming step, while the criteria for conducting the forming step according to Comparative Examples 1 and 2 are from 160° C. to 180° C. and from 170° C. to 195° C., respectively (FIGS. 4 and 5).

Since the metallic molded products which were obtained by molding the metallic decorative sheets according to Examples 1 to 6 have a wide range of temperature of 40° C. (170° C. to 210° C.) in which the molding can be easily performed, the result was shown that the surface temperature of the metallic decorative sheet can be easily maintained within the temperature range in the heating step to the forming step. This result is obvious also from the evaluation results of the finishing property of the molded product shown in Table 4. For both the surface temperatures of the metallic decorative sheet of 175° C. and 205° C., there is no problem with the shape of the metallic molded product. In addition, the decorativeness and the design were good, the finishing property was good, wherein no occurrence of defective products was found. In this manner, it is possible to increase the temperature range to 160° C. to 215° C. which can achieve good finishing property, even near temperature ranges in which the drawdown is ended and/or melting is started, the metallic molded product could be produced without problems as long as it is conducted within such a range of temperature. The metallic decorative sheets according to Examples 1 to 6 obtained a chromium-plated tone design due to the haze.

On the other hand, since the metallic decorative sheet according to Comparative Example 1 has a narrow range of temperature which allows easy molding (160° C. to 180° C.), it was difficult to maintain the surface temperature of the metallic decorative sheet within this temperature range in the heating step to the molding step. It took a certain time until the metallic decorative sheet has been moved from the heating section to the molding section of the vacuum pressure-compressed air forming machine, fitted to a die and the forming has been completed. Due to the presence of movement time, even when heating so as to bring the surface temperature of the metallic decorative sheet according to Comparative Example 1 within the temperature range allowing easy molding, the sheet may be cooled down until moving to the molding section. Therefore, the surface temperature of the sheet becomes lower than the temperature allowing easy moldability during the molding step, which results in unsharp contours of recessed and/or protruding corners, metallic molded products with poor contrast, which did not satisfy the finish property. When the surface temperature of the metallic decorative sheet according to Comparative Example 1 at start of molding was 175° C., the finish property was satisfied (Table 5), it was however necessary to control the movement time from the heating section to the molding section and the forming time and the like strictly. This means that, in the production of the metallic decorative sheet of Example 1, it was very difficult e.g. to allow time margin for each step, and the production was possible only under limited conditions. In addition, when heating was performed to increase the surface temperature of the sheet above the melting point to bring the surface temperature of the sheet during the molding step within the temperature range allowing easy molding in consideration of the movement time from the heating section to the molding section in order to allow time margin for each step, there was no problem with the shape of the metallic molded product. However, the occurrence of the whitening phenomenon or the like was found due to heating to a temperature exceeding the temperature which caused the molten state. In particular, a whitening phenomenon and the like were found at the protruding corner 510 and the recessed corner 520. As a result, many defective products with a defective shape of the molded products or defective metallic molded products in which the whitening phenomenon or the like occurred were produced, and the yield is low. Furthermore, when the surface temperature of the metallic decorative sheet according to Comparative Example 1 at the start of molding was 205° C., the whitening phenomenon was found not only at the protruding corner 510 and the recessed corner 520, but also at the flat part of the metallic molded product so that the finishing property was not satisfied (Table 5).

In the case of the metallic decorative sheet according to Comparative Example 2, the range of temperature allowing easy moldability (170° C. to 195° C.) was 25° C., which is wider than that of Comparative Example 1, however the same result was obtained as the Comparative Example 1. That is, many defective products with a defective shape of the molded products or defective metallic molded products in which the whitening phenomenon or the like occurred were produced, and the yield is low. In particular, similarly to Comparative Example 1, when the surface temperature of the metallic decorative sheet was 175° C. and the movement time from the heating section to the molding section, the forming time and the like was controlled strictly, the finishing property was satisfied, however, when the surface temperature was 205° C., the whitening phenomenon was found not only at the protruding corner 510 and the recessed corner 520, but also at the flat part of the metallic molded product so that the finishing property was not satisfied (Table 5).

In addition, in the case of the metallic decorative sheets according to Comparative Examples 3 and 4, the recessed and/or protruding corners had unsharp contours due to the film layer to hold the metal layer being an unmodified PET even when molding was performed in a temperature range of 200° C. to 220° C., which resulted in metallic molded products with poor contrast, which did not satisfy the finishing property. It is to be assumed that this is because unmodified PET is biaxially stretched in the longitudinal direction and the transverse direction when being formed into a film, thereby increasing the molecular orientation and thus causing crystallization so that the PET is no longer suitable for molding due to stronger tensile stress. In the case of a modified PET, it is to be assumed that a copolymer component to be modified suppresses crystallization to achieve excellent moldability as compared with an unmodified PET.

[Production of Metallic Decorative Sheet Intermediate Product]

(Third Laminate)

Indium with a purity of 99.99% is attached to one side of the film to hold the metal layer A by a vacuum deposition method, and a 40 nm-thick indium layer is held as a metal layer by the film to hold the metal layer A to obtain a metallic decorative sheet intermediate product. Next, on surfaces of the film to hold the metal layer A and the metal layer, polyurethane (PU)-based adhesive (main agent: polyol (Takelac A-1143, manufactured by Mitsui Chemicals), curing agent: isocyanate (Takenate A-3, manufactured by Mitsui Chemicals), and ethyl acetate as a solvent were used) was applied and dried, and then, a polycarbonate (PC)-based resin protection film (Shinetech PC11U, 125 μm thick, manufactured by ShineTechno) is applied to the film to hold the metal A via an adhesive. With this step, a first adhesive layer with a thickness of 5 μm and a second adhesive layer with a thickness of 5 μm as well as a protection film layer with a thickness of 125 μm were formed to obtain a metallic decorative sheet including a third laminate.

For the intermediate product, a base film layer made of a polycarbonate (PC)-based resin was applied to the metal layer via the first adhesive layer. Through these steps, a metallic decorative sheet (Example 7) was obtained via the third laminate.

Using the metallic decorative sheet according to Example 7, a metallic molded product was produced in the same manner as in the case of using the metallic decorative sheet according to Example 2. As a result, similarly to Examples 1 to 6, a metallic molded product could be obtained which would not cause the whitening phenomena or the like and had excellent decorativeness and design, by maintaining the surface temperature of the metallic decorative sheet according to Example 7 within the temperature range of 160° C. to 215° C. Especially, it was possible to mold a metallic molded product more easier by maintaining the surface temperature at the temperature from 170° C. to 210° C. during the molding step.

The results of Examples 1 to 7 showed that it is possible to produce a metallic decorative sheet with the same quality using any intermediate product of the first to third laminates, and it is also possible to produce a metallic molded product with the same quality.

SUMMARY

From the results of the above examples, with the film to hold the metal layer of the present invention, molding can be accomplished in a wider temperature range when molding a metallic molded product, so that the temperature allowing molding can be maintained in the heating step to the molding step. As a result, it is obvious that it is possible to prevent the occurrence of the whitening phenomenon or the like of the metallic molded product and thus the good finishing property is satisfied.

As described above, the preferred embodiments of the present invention have been described in detail, however, the present invention is not limited to such examples. It is obvious that those skilled in the art can arrive at various exemplar variations or modifications within the scope of the technical idea stated in the Claims, wherein it is to be understood that they are also included in the technical scope of the present invention.

REFERENCE SIGNS LIST

1 Protection film layer
2 Second adhesive layer
3 Film layer to hold a metal
4 Metal layer
5 First adhesive layer
6 Base film layer
10 First laminate
20 Second laminate
30 Third laminate
40 Fourth laminate
100 Metallic decorative sheet
110 First end
120 Second end
200 Clamp
210 First clamp portion
220 Second clamp portion
300 First heat generating body
310 First heater
350 Second heat generating body
360 Second heater
400 Die
410 Suction hole
420 Compressed air box 430 Compressed air hole
500 Metallic molded product
510 Protruding corner
520 Recessed corner

What is claimed is:

1. A metallic decorative sheet intermediate product, comprising:
a metal layer; and
a film layer to hold the metal layer comprising a film to hold the metal layer, wherein the film holds the metal layer, wherein the film to hold the metal layer comprises: a thermoplastic resin that is a modified polyethylene terephthalate resin having a melting point of 235° C. to 243° C., wherein the film to hold the metal layer has transparency,
a second adhesive layer including one resin or a mixture of two or more resins selected from polyurethane-based, polyvinyl acetate-based, ethylene vinyl acetate copolymer-based, epoxy-based, and silicone-based resins,
wherein the metal layer, the film layer to hold the metal layer and the second adhesive layer are laminated in sequence, and
wherein the thickness of the metal layer is 10 nm to 100 nm, and
wherein the metal layer has a sea-island structure in which islands of metal particle have gaps apart from each other,
wherein the metal layer is vacuum-deposited on one side of the film layer to hold the metal layer,
wherein the film to hold the metal layer is a film that is softened and drawn down by heating, and wherein a temperature difference between a temperature at which the film to hold the metal layer recovers from draw-down and a temperature at which the film to hold the metal layer starts to hang down due to melting is from 95° C. to 120° C.,
wherein the temperature difference is determined for the film to hold the metal layer by performing a clamping step and a heating step and then measuring changes in a surface temperature of the film to hold the metal layer and the hanging state of the film to hold the metal layer,
wherein the clamping step includes cutting the film to hold the metal layer into 350 mm×300 mm, and the film to hold the metal layer is sandwiched from above and below by a clamping frame of a vacuum-compressed air forming machine, and four sides of the film to hold the metal layer is gripped so as not to cause loosening by their own weight,
wherein the heating step is performed after the clamping step, the film to hold the metal layer is moved to a heating section of the vacuum-compressed air forming machine, and heaters each having nine heat generating bodies are arranged above and below the film to hold the metal layer, and then the film to hold the metal layer is heated uniformly, and wherein
during the heating step, the film to hold the metal layer is observed in a horizontal direction to evaluate the behavior of hanging of the sheet due to heating.

2. The metallic decorative sheet intermediate product according to claim 1, wherein a total luminous transmittance of the film to hold a metal layer is 85% or more.

3. The metallic decorative sheet intermediate product according to claim 1, wherein a haze of the film to hold a metal layer is 2.0% or less.

4. The metallic decorative sheet intermediate product according to claim 1, comprising:
a first laminate with
the film layer to hold the metal layer,
the metal layer and
a first adhesive layer
laminated in this sequence.

5. The metallic decorative sheet intermediate product according to claim 1, comprising:
a second laminate with the second adhesive layer,
the film layer to hold the metal layer,
the metal layer,
a first adhesive layer and
a base film layer
laminated in this sequence.

6. The metallic decorative sheet intermediate product according to claim 1, comprising:
a third laminate with
a protection film layer having transparency,
the second adhesive layer,
the film layer to hold the metal layer,
the metal layer, and
a first adhesive layer
laminated in this sequence.

7. The metallic decorative sheet intermediate product according to claim 1, wherein a total luminous transmittance of the film to hold the metal layer is 85% or more.

8. The metallic decorative sheet intermediate product according to claim 1, wherein a haze of the film to hold the metal layer is 2.0% or less.

9. The metallic decorative sheet intermediate product according to claim 1, wherein the thermoplastic resin is polyethylene terephthalate modified with neopentyl glycol.

10. A metallic decorative sheet comprising the metallic decorative sheet intermediate product according to claim 1 comprising:
a fourth laminate with:
a protection film layer having transparency,
the second adhesive layer,
the film layer to hold the metal layer,
the metal layer,
a first adhesive layer and
a base film layer
laminated in this sequence.

11. An extruded laminate product comprising a metallic decorative sheet according to claim 10 and
a resin sheet,
wherein the resin sheet is laminated on the protective film layer and/or the base film layer.

12. A metallic molded product comprising a molded product of the metallic decorative sheet according to claim 10.

13. An injection molded product comprising:
the metallic molded product according to claim 12; and
a resin layer,
wherein the resin layer is injected and molded on a surface of the base film layer of the metallic molded product.

14. A method for producing a metallic molded product, comprising:
a molding step of fitting the metallic decorative sheet according to claim 10 having a surface temperature of 160° C. to 215° C. to a mold to obtain a molded product.

15. The method for producing a metallic molded product according to claim 14, wherein the metallic decorative sheet is fitted to the mold by vacuum and/or compressed air.

16. The method for producing a metallic molded product according to claim 14, comprising, before the molding step,
- a clamping step of clamping the metallic decorative, and
- a heating step of heating the metallic decorative sheet after the clamping step.

17. A method for producing an injection molded product, comprising:
- an injection molding step of using an injection molding die to inject a resin between a surface of the base film layer of a metallic molded product obtained with the method for producing the metallic molded product according to claim 14 and the injection molding die in order to form a resin layer so that a molded product is obtained in which the metallic molded product is integrated with the resin layer.

18. The method for producing an extruded laminate product, comprising:
- a laminating step of laminating a molten resin sheet on the protection film layer and/or the base film layer of the metallic decorative sheet according to claim 10.

* * * * *